(12) United States Patent
Kurnia et al.

(10) Patent No.: US 6,411,534 B1
(45) Date of Patent: Jun. 25, 2002

(54) CONTROL METHODS FOR POWER CONVERTER CIRCUIT

(75) Inventors: Alexander Kurnia, Wheeling, IL (US); Eric C Pratt, Kokomo; Kaushik Rajashekara, Carmel, both of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/874,785

(22) Filed: Jun. 5, 2001

(51) Int. Cl.[7] ................. H02M 3/24; H02M 7/5387
(52) U.S. Cl. ................................. 363/98; 363/132
(58) Field of Search .................... 363/16, 17, 26.01, 363/56.02, 56.03, 56.05, 97, 98, 131, 132

(56) References Cited

U.S. PATENT DOCUMENTS 5,594,634 A * 1/1997 Rajashekara et al. ........ 363/98
6,166,602 A * 12/2000 Steigerwald et al. ........ 330/251
6,243,275 B1 * 6/2001 Ferencz ........................ 363/17

* cited by examiner

*Primary Examiner*—Matthew Nguyen
(74) *Attorney, Agent, or Firm*—Margaret A. Dobrowitsky

(57) ABSTRACT

Control methods for operating a power converter circuit, consisting of a full bridge DC/DC converter stage and a full bridge DC/AC inverter stage, for use in automobiles and other vehicles. The DC/DC converter is operated by pulse width modulation and by "soft switching" and "synchronous switching" which involves turning MOSFET switches OFF and ON at strategic times to gain improvements in system performance. The DC/DC converter is also operated at a relatively high and relatively constant duty cycle, and is controlled in such a way as to make the output operate as a current source. The DC/AC inverter has a cycle by cycle overload current protection scheme.

16 Claims, 6 Drawing Sheets

CONTROL METHODS FOR POWER CONVERTER CIRCUIT

TECHNICAL FIELD

The present invention relates to control methods for operating a power converter circuit for use in automobiles and other vehicles.

BACKGROUND OF THE INVENTION

Due to consumer demand for comfort and convenience and complex control systems required to meet governmental regulation, electrical demands on modern automobiles have increased substantially over the years. Many consumers desire automobiles from which they can operate external accessories, such as laptop computers, and which provide a high power output to operate several accessories at once. In order to accommodate this desire, the automobile must contain an efficient power converter circuit, which converts a low input DC voltage from the automobile battery into a single phase 120V AC 60 Hertz sinusoidal output voltage with sufficient power to operate the external accessories.

Conventional converters consist of two stages: a DC/DC converter and a DC/AC inverter. Specifically, full bridge DC/DC converters with conventional pulse width modulation (PWM) current and voltage mode control, full bridge DC/DC converters with zero voltage transition phase shifted control, resonant mode DC/DC converters, current source DC/DC converters, and devices that convert low input DC voltage to a single phase 120V AC voltage are known.

Typically, full bridge DC/DC converter circuits are power switching circuits that have four transistors connected in a bridge configuration to drive a transformer primary. These DC/DC converters operate by high frequency switching action employing inductive and capacitive filter elements and are often controlled by pulse width modulation (PWM). PWM is a switching power conversion technique where the width of a duty cycle is modulated to control power transfer. A pulse width modulator is generally an integrated discrete circuit used in switching-type power supplies, to control the conduction time of pulses produced by a clock.

These DC/DC converters and DC/AC inverters operate certain ways, such as the simultaneous switching ON and OFF of two pairs of MOSFETs in a full bridge DC/DC converter, where one pair of MOSFETs alternates with the other pair, or fluctuating the duty cycle in the DC/DC converter to maintain a fairly constant DC output at the first stage. The secure method of operation has certain disadvantages. These simultaneous switches and fluctuating duty cycle result in high switching losses, high circulating currents, and undesirable voltage notches and ringing, resulting in reduced efficiency and increased noise. It is the objective of the present invention to provide a method of operating a power converter circuit to overcome these disadvantages.

SUMMARY OF THE INVENTION

The power converter circuit of the present invention includes two stages. The first stage is an isolated full bridge DC/DC converter circuit that converts the low input DC voltage to an isolated high voltage DC. The second stage is a full bridge DC/AC converter circuit that converts the high voltage DC to a single phase 120V AC 60 Hertz sinusoidal output voltage. Each stage has its own control circuit (one for the DC/DC converter and one for the DC/AC inverter).

The two control circuits used in the present invention incorporate four methods of operation. First, the DC/DC control circuit operates the DC/DC converter by "soft switching." Instead of switching each pair of MOSFETs OFF simultaneously, the method of the present invention switches each pair of MOSFETs OFF at different times. The DC/DC control circuit also provides full PWM control and "Synchronous Switching" of the full bridge DC/DC converter of the first stage. This operation results in reduced circulating current and reduced voltage ringing, resulting in increased efficiency.

Second, the DC/DC control circuit of the present invention keeps the duty cycle relatively constant and lets the DC/DC converter output voltage fluctuate in proportion to fluctuation of the input voltage. By setting the duty cycle at a constant and relatively high level, the switches are ON more often than they are OFF. This operation results in less average circulating current and improved efficiency.

Third, the DC/DC control circuit of the present invention operates the converter in current source mode. Operation of the DC/DC converter in current source mode prevents the DC/AC inverter's second harmonic circulating current from flowing back through the DC/DC converter stage. This operation reduces the main device losses and current stresses in the DC/DC converter circuit, reduces input filtering requirements, and reduces noise.

Fourth, the DC/AC inverter control circuit of the present invention provides inverter protection control for the second stage. The inverter protection circuit provides a real time current limit protection scheme that measures and evaluates the current in the DC/AC inverter circuit every switching cycle. Under excessive current conditions, the inverter protection circuit turns OFF the transistors in the DC/AC inverter. Although the circuitry for operating a current limit protection scheme is known, it has not been applied on a cycle by cycle basis to second stage DC/AC inverters in a power converter circuit.

Use of these control methods in this manner provides numerous advantages. The DC/DC converter control circuit of the present invention achieves low harmonic distortion of output voltage waveforms with excellent voltage regulation over a wide range of loads. In addition, it lowers switching losses, noise, and circulating current.

BRIEF DESCRIPTION OF THE DRAWINGS

The present invention will now be described, by way of example, with reference to the accompanying drawings, in which.

DETAILED DESCRIPTION OF THE PREFERRED EMBODIMENT

Figure 1:
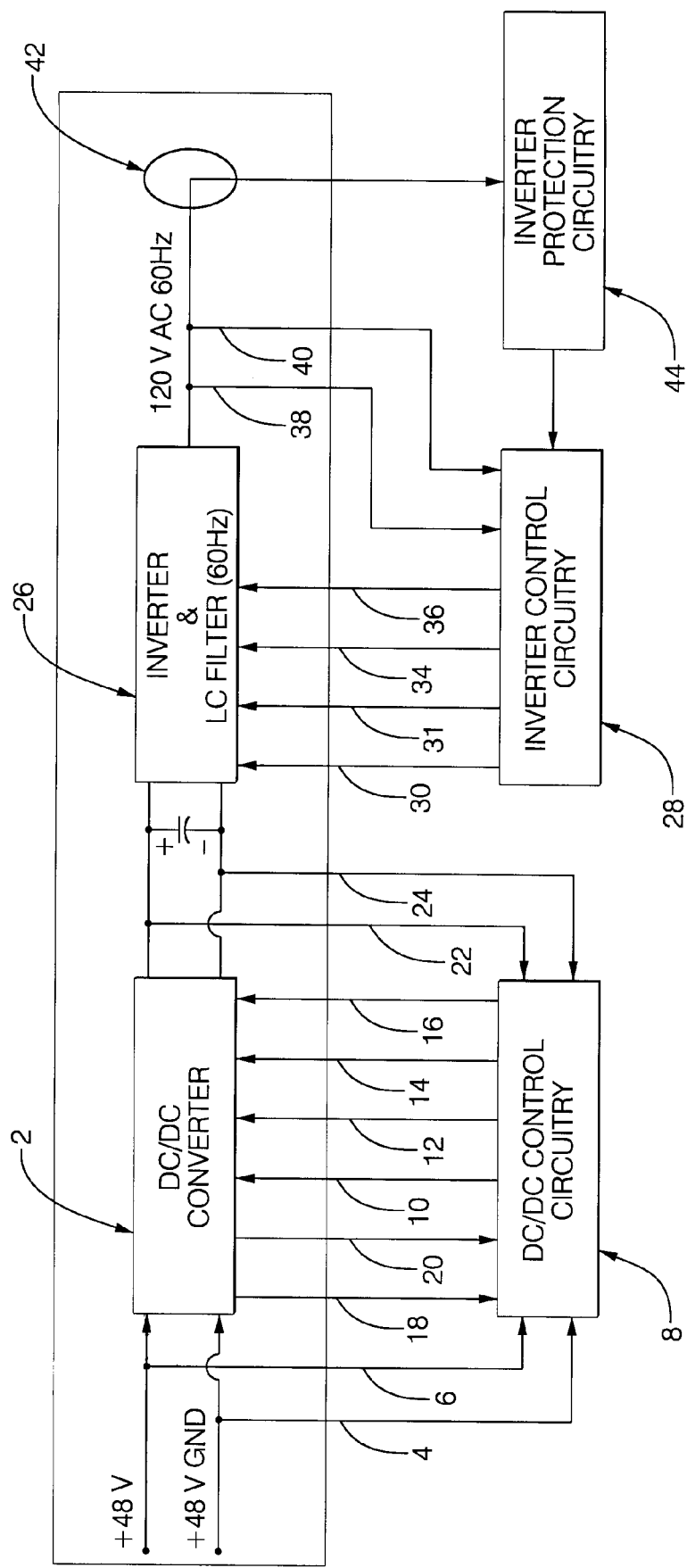
FIG. 1 is a block diagram of the power converter circuit the present invention.

Referring now to the drawings, FIG. 1 illustrates the general conventional topology of the power converter circuit. The battery, not shown, produces a 48V DC signal, and is connected to the DC/DC converter circuit 2. The signal produced by the battery may fluctuate between 32 and 60V. The battery also sends a voltage feedforward signal (4, 6) to the DC/DC control circuit 8. The DC/DC control circuit sends four signals (10, 12, 14, 16) into the DC/DC converter circuit and receives current (18, 20) and voltage feedback signals (22, 24) from the converter circuit. In the preferred embodiment, the DC/DC converter produces a DC output (DC link voltage) of 200–290V.

The DC link voltage is the input voltage for the DC/AC inverter and LC filter 26. The inverter control circuit 28 sends four signals (30, 32, 34, 36) into the inverter and receives a voltage feedback signal (38, 40) from the inverter. The DC/AC inverter and LC filter produce a 120V AC 60 Hertz output. The output current then passes through a current sensor 42 that measures the current cycle by cycle and relays this signal to the inverter protection circuit 44. This circuit detects excessive current and relays this signal back to the inverter control circuit.

Figure 2:
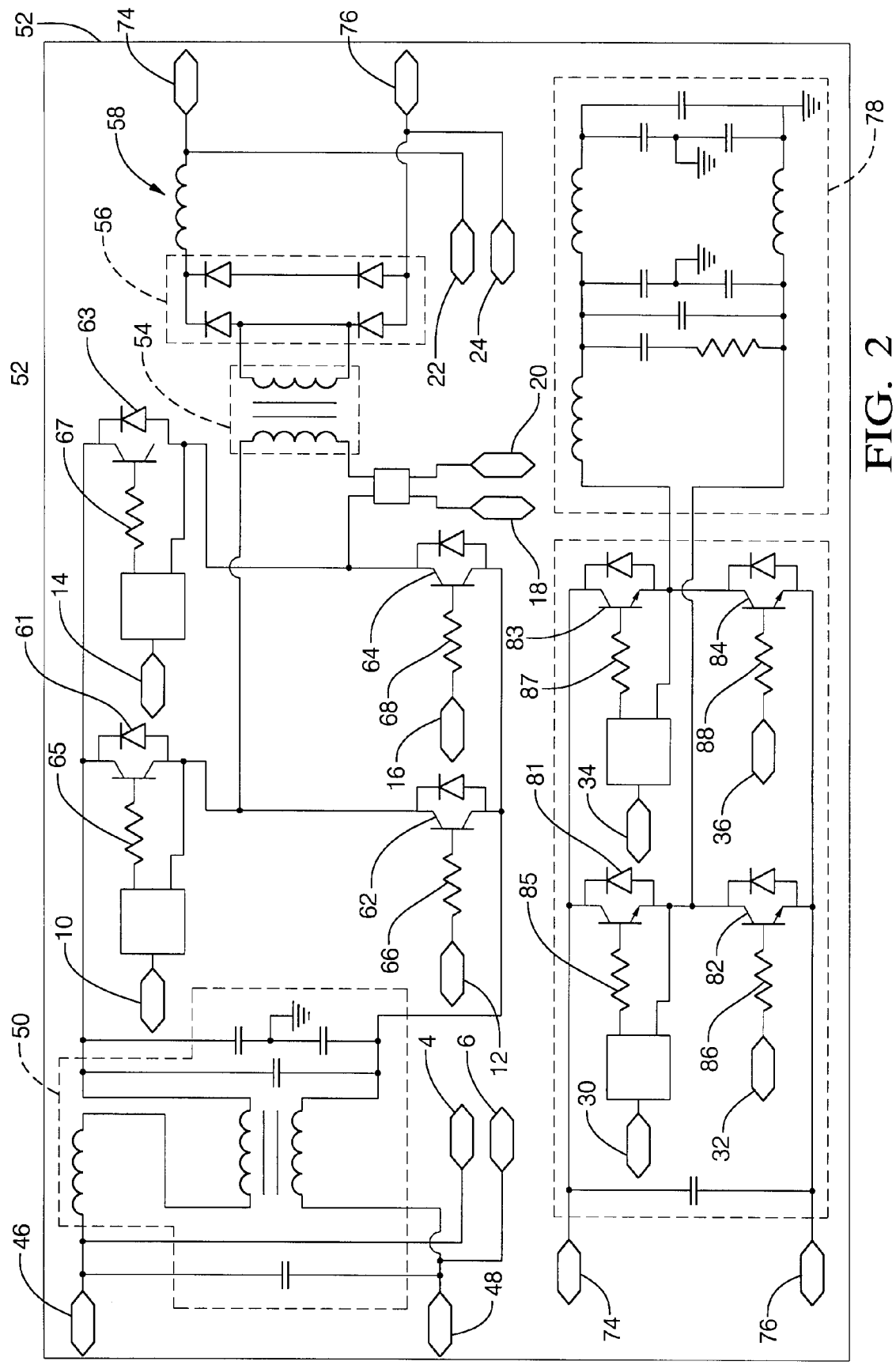
FIG. 2 is a circuit diagram of the power converter circuit of the present invention, excluding control circuits.

FIG. 2 illustrates a circuit diagram showing the DC/DC converter and the DC/AC inverter used in the present invention. The battery, not shown, produces a 48V DC input signal (46, 48) and is connected to an input filter 50 that filters out AC noise. The battery also sends a feedforward signal (4, 6) to the DC/DC control circuit, which is not shown. The input filter is, in turn, connected to the first stage of the power converter circuit, a full bridge DC/DC converter circuit 52. The DC/DC converter circuit consists of four MOSFETs (61, 62, 63, 64) with series resistances (65, 66, 67, 68), each MOSFET with its own gate and body diode. Each gate receives a signal (10, 12, 14, 16) from the DC/DC control circuit.

The current flowing in the DC/DC converter circuit passes through the primary of an isolation transformer 54, and this current is fed back (18, 20) to the DC/DC control circuit. In turn, current and voltage are generated in the secondary of the transformer 54. The signal then passes through a full wave rectifier 56 and an inductor 58. The resulting DC voltage is fed back (22, 24) to the DC/DC control circuit at the DC link voltage (74, 76).

FIG. 2 also illustrates the DC/AC inverter topology with an LC filter. The high input DC link voltage (74, 76) is connected to the full bridge DC/AC inverter 70, which consists of four transistors (81, 82, 83, 84), with series resistances (85, 86, 87, 88), connected in a full bridge configuration. The bases of the transistors receive signals (30, 32, 34, 36) from a PWM control in the inverter control circuit, which is not shown. The full bridge switching network is, in turn, connected to an LC filter (78), which filters out the high frequency components and provides the 60 Hz sinusoidal output. The DC/DC control circuit and the DC/AC control circuit are constructed according to any suitable electronic means known to those skilled in the art.

The DC/DC converter circuits are typically operated cyclically by sending pulses to the gates of the MOSFETs, such that two of the MOSFETs diagonal to each other are ON at any one time. Correspondingly, the other two MOSFETs are OFF at this time. Thus, in FIG. 2, MOSFET 61 and MOSFET 64 may be "switched" ON at a given time while MOSFET 62 and MOSFET 63 are OFF. The prior art teaches the simultaneous switching ON and OFF of each pair of MOSFETs.

The first control method of the present invention is to operate the DC/DC converter by "soft switching" with "synchronous switching." Under this operation each pair of diagonal MOSFETs is not turned ON and OFF simultaneously. Instead, after one MOSFET of a pair is turned OFF, the other MOSFET remains ON for a period of time, during which it's counterpart MOSFET opposite the transformer is switched on. This process alternates between each pair of MOSFETs and continues cycle by cycle.

Figure 3:
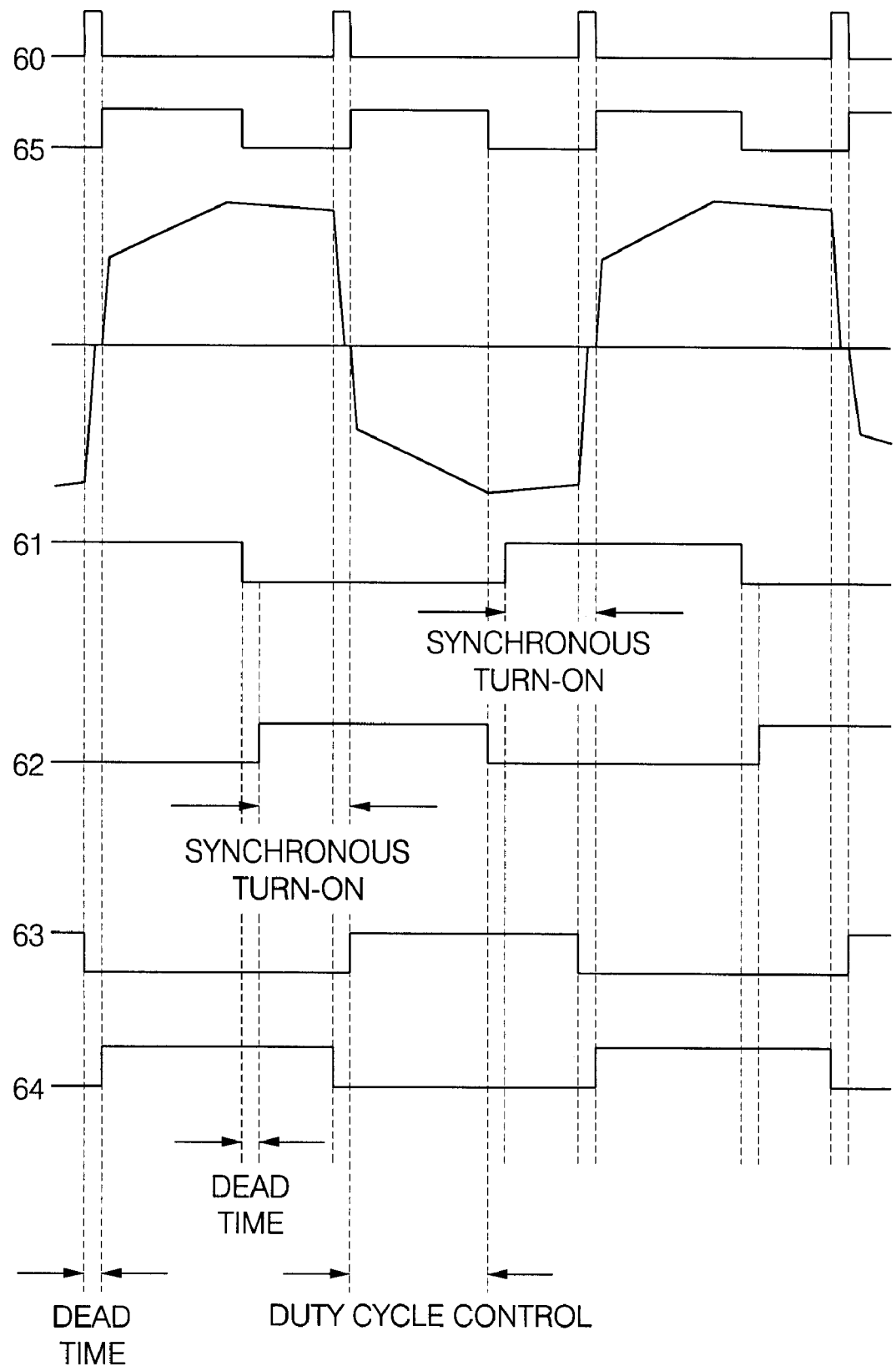
FIG. 3 is a schematic timing diagram illustrating the DC/DC converter switching control method of the present invention at preferred switching frequency. It also shows the current waveform in the transformer primary as it changes during each switching cycle.
Figure 4:
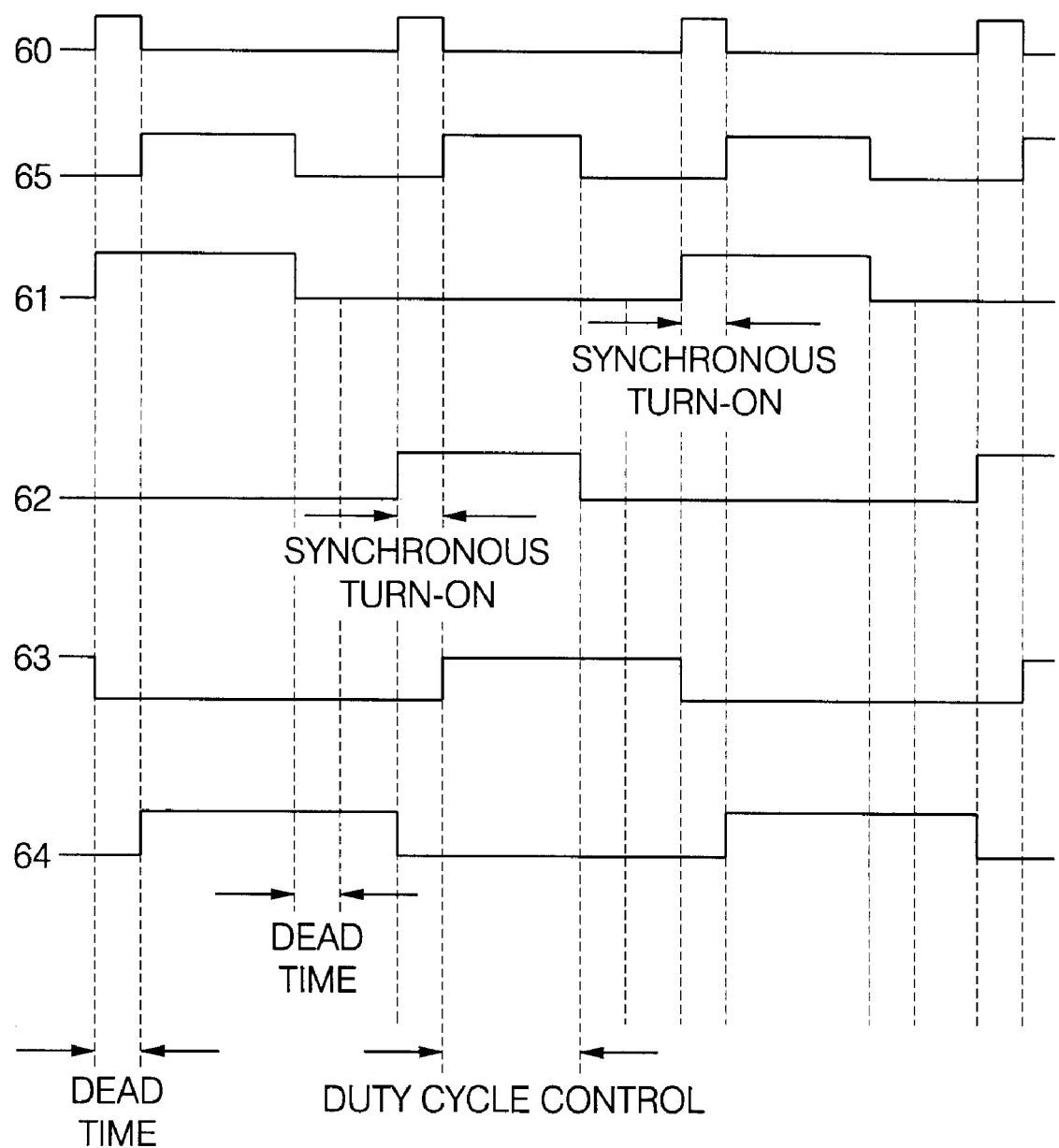
FIG. 4 is a schematic timing diagram illustrating the DC/DC converter switching control method at relatively high switching frequency.

FIGS. 3 and 4 are timing diagrams that show the signals sent to the gates of the MOSFETs over time and show whether a MOSFET is ON or OFF at any one time. The PWM clock 60 sets the constant switching frequency, and therefore the period of each switching cycle. The PWM output 65 is a modulated output from the controller which controls when MOSFETs 61 and 62 turn ON and OFF. By controlling MOSFETs 61 and 62 the duty cycle of current through the transformer primary is modulated, which effectively controls power transfer. The PWM output 65 is not applied to the other two MOSFETs (MOSFET 63 and MOSFET 64); they are operated at a fixed duty cycle. In the preferred embodiment, the modulated duty cycle can vary from 0% to 90% of the total duty cycle, while the fixed duty cycle is constant at slightly over 90% of the total duty cycle.

FIG. 3 also shows current in the DC/DC converter transformer primary. The Primary Current waveform shows the ideal magnitude and direction of current flow in the primary. When the PWM signal is ON, current magnitude increases and power is transferred to the secondary. When the PWM signal turns OFF, current due to leakage inductance just circulates in the primary and the MOSFETs, and no power is transferred to the secondary.

FIG. 3 illustrates timing of the MOSFET gating signals at the preferred switching frequency, while FIG. 4 shows alternative timing for a system running at a relatively high switching frequency where the PWM clock duty cycle and "dead time" take up a large percentage of the switching period. A certain amount of "dead time" is required to prevent "shoot through," a catastrophic failure mode where two MOSFETs of the same phase (i.e. MOSFETs 61 and 62) are ON at the same time, creating a short through the MOSFETs and destruction of the device. When the gate of a MOSFET is taken low, the MOSFET does not turn off instantaneously. So, "dead time" is required to make sure it is completely OFF before turning the other adjacent MOSFET ON.

Figure 5:
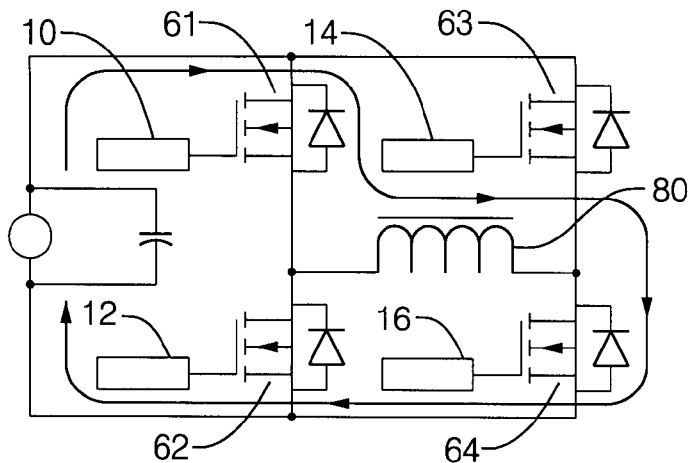
FIGS. 5 through 9 are circuit diagrams showing how the current flows through the DC/DC converter MOSFET switches of the present invention at various times.

FIGS. 5 through 9 show the operation of the DC/DC converter circuit at various points in time, representing different switch "states" of the circuit which correspond to changes in the PWM output 65. FIG. 5 shows the current flow when the PWM output is ON. In FIG. 5, MOSFET 61 and MOSFET 64 are both ON while MOSFET 62 and MOSFET 63 are both OFF. When both MOSFET 61 and MOSFET 64 are ON, voltage is applied to the transformer primary, current flows through the primary in the direction shown, and power is transferred to the secondary. FIG. 3 shows the increase in current magnitude during this switch state.

Figure 6:
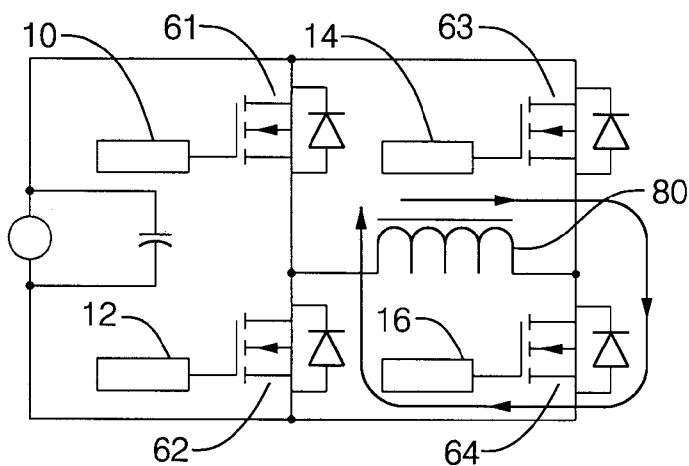

The next stage, shown in FIG. 6, occurs when the PWM output switches from ON to OFF. When the PWM output initially switches from ON to OFF, only one MOSFET remains ON. In this case, MOSFET 61 is switched OFF and only MOSFET 64 remains ON. When the PWM output switches from ON to OFF, the circuit enters the "dead time" period shown on FIG. 3, and the transformer primary 80 experiences a "zero state voltage." A "zero state voltage" condition occurs because MOSFET 64 was allowed to remain ON, allowing current to circulate in the bottom two switches and effectively short out the transformer primary.

Power transfer to the secondary is disabled and will remain disabled until the PWM signal 65 is reactivated. FIG. 6 shows the circulating current—primarily due to transformer leakage inductance—as it circulates through MOSFET 64 and the MOSFET 62 body diode. The current magnitude is decreasing very little at this point, because there is no driving voltage across the transformer primary. Only losses in the switch and forward voltage drop from the body diode are contributing. By taking the transformer primary voltage to a "zero state voltage" before reversing the polarity across it, the dt/dI in the circuit is small which helps prevent ringing and noise.

Up to this point, everything in the switching control scheme is similar to prior art. Here is the biggest difference between prior art and this switching control scheme. After the "dead time," MOSFET 62 is turned ON and the circuit enters the "Synchronous Turn-on" period shown in FIG. 3. Now the current continues to circulate as it did during the "dead time" period shown in FIG. 6, but flows through the channel of MOSFET 62 instead of the body diode. The current continues to circulate with little reduction in amplitude. The advantage gained by turning ON MOSFET 62 is that there is less loss in the device, and no reverse recovery of the body diode. Squelching reverse recovery helps prevent voltage overshoot and ringing, resulting in considerable noise reduction. Electromagnetic Interference is also diminished and an overall improvement in system performance is achieved.

Figure 6A:
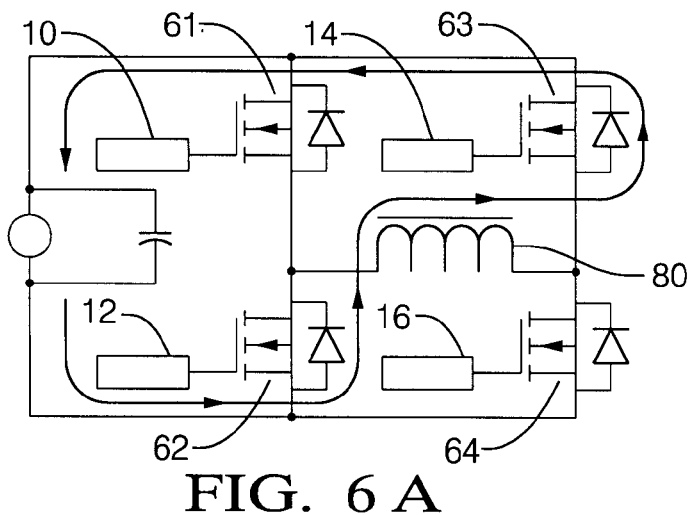

Toward the end of the "synchronous Turn-on" period, MOSFET 64 is turned OFF. During the "dead-time" immediately after MOSFET 64 is turned OFF, the circulating current is commutated to MOSFET 63 body diode and flows as shown in FIG. 6A through MOSFET 62 and MOSFET 63 body diode. This reverses the voltage on the transformer primary, which drives the circulating current amplitude down to 0 Amps, as shown in FIG. 3. The leakage inductance of the transformer 80 needs to be small enough so that the current amplitude can decrease to 0 Amps before PWM signal 65 is reactivated. The maximum leakage inductance required to achieve soft switching is defined by the equation: $L_L = V_i (\Delta t_d / I_{LPK})$ where $L_L$ is the maximum leakage inductance, $V_i$ is the maximum voltage across the transformer primary, $\Delta t_d$ is the "dead time" period or length of the switching state shown in FIGS. 3 and 4, and $I_{LPK}$ is the peak switched current through the primary. This maximum value is only applicable under ideal conditions. Because circuits also have inductance associated with the conduction path (bus inductance), the actual maximum permissible leakage inductance of the primary is reduced by this bus inductance.

Figure 7:
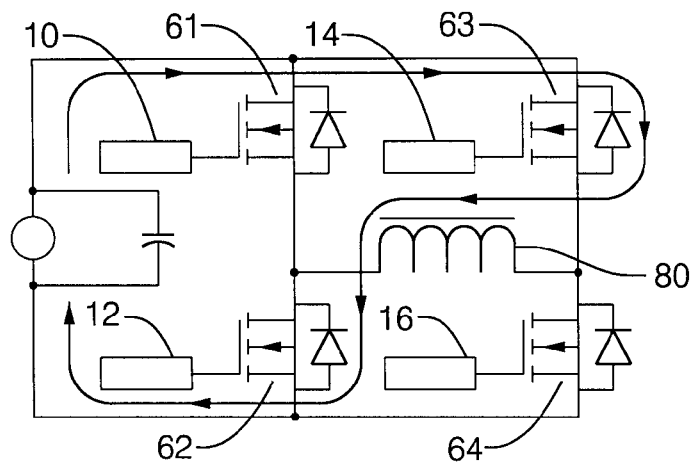

Following the "dead-time" at the end of the Synchronous Turn-On period, the PWM output switches from OFF to ON, controlling MOSFET 63 to turn ON, while MOSFET 62 remains ON. So current starts to flow the other direction through the transformer primary and power is once again transferred to the secondary. FIG. 7 illustrates this switch state with current flowing in the opposite direction through the transformer primary via MOSFETs 62 and 63.

Figure 8:
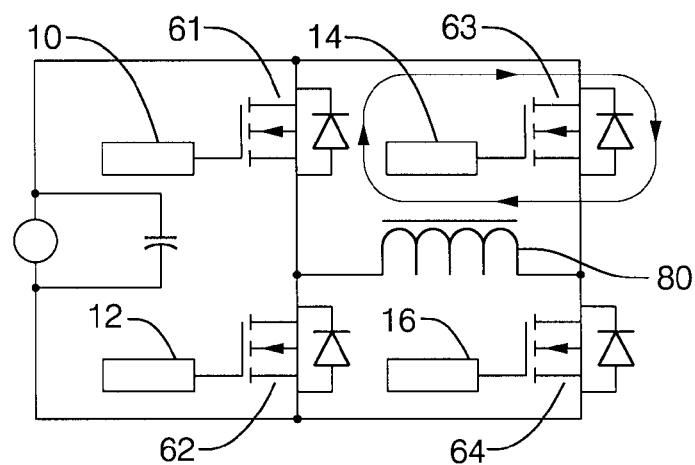

In FIG. 8, the PWM output has again been switched from ON to OFF and power transfer is disabled. When the PWM output is switched OFF, MOSFET 62 is turned OFF and only MOSFET 63 remains ON. When the PWM output is OFF, the transformer primary again experiences a "zero state voltage." The voltage across the transformer primary is basically shorted and current due to leakage inductance is now circulating in the top two switches. The current circulates through MOSFET 63 and the MOSFET 61 body diode. After the "dead-time" which immediately follows deactivation of the PWM signal, MOSFET 61 is turned ON. This again is "Synchronous Turn-On," of the upper switch this time. Current continues to flow as shown in FIG. 8, but now flows through the channel of MOSFET 61 instead of its body diode. This again prevents diode reverse recovery.

Figure 9:
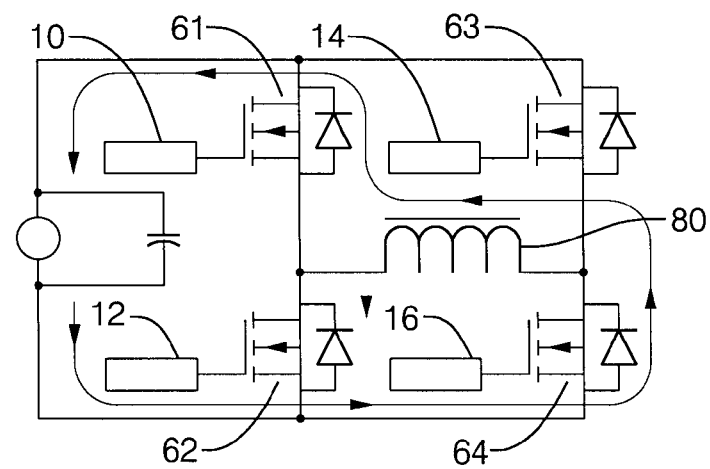

Finally, at the end of "Synchronous Turn-On" MOSFET 63 is deactivated and the circuit enters another "dead-time" period. Current flow is commutated to the MOSFET 64 body diode and flows as shown in FIG. 9. The transformer polarity is reversed, and current magnitude is driven to zero as shown in FIG. 3. After the "dead-time" the PWM output is reactivated and power transfer takes place again. The operation of the circuit proceeds in a cyclical fashion.

The soft-switching operation depends on the output capacitance of the main switches. Additional capacitance can be added for softer turn-off operation. In addition, application of the fixed duty cycle to the gates of MOSFET 61 and MOSFET 62 could be interchanged with application of the PWM control to the gates of MOSFET 63 and MOSFET 64.

The second control method of the present invention is to operate the DC/DC converter 2 at a relatively high and relatively constant duty cycle, thereby letting the DC link voltage (74, 76) fluctuate based on the fluctuation of the input DC voltage. Although the input DC voltage is nominally 48V, the actual input DC voltage may range from 32 to 60V. By operating the DC/DC converter 2 at a relatively high and relatively constant duty cycle, the main switches are on more often than they are off. Since circulating current only flows when the switches are OFF, keeping the duty cycle high creates less average circulating current, which reduces loss and improves efficiency. By operating at a relatively constant duty cycle the DC link voltage will vary directly in proportion to the input voltage. In the preferred embodiment, the range of the DC link voltage is roughly 200V to 290V.

The third control method of the present invention is to operate the DC/DC converter in current source mode. This control method can be achieved through peak current mode control topology, which is known in the art. This is a control method for a switching converter where the converter adjusts its PWM output in response to measured output current and output voltage. As shown in FIG. 1, the DC/DC converter 2 provides feedback current (18, 20) and voltage (22, 24) signals to the control circuit 8. So there are two feedback loops: a fast response current feedback "inner" loop, and a slow response voltage feedback "outer" loop. The average output current is controlled by the feedback voltage, creating a voltage controlled current source. The controller's slow response to changes in output voltage creates a relatively constant output current, regardless of fluctuations in output voltage. Because the final output (Inverter output) is a single phase 120V AC 60 Hertz voltage, there will be a 120 Hertz second harmonic on the output of the DC/DC converter. This second harmonic current component would flow back through the DC/DC converter if it were not operated as a current source. By making the DC/DC converter output act like a current source, the 120 Hertz circulating current harmonic, and any other ripple current, is prevented from flowing back through the DC/DC converter stage to the input. This prevents added loss in the DC/DC converter switches, and greatly reduces input current fluctuation, which in turn reduces input filtering requirements and conducted emissions.

The fourth control method of the present invention is a cycle by cycle output current limiting scheme. This involves the protection circuit 44 for the DC/AC inverter 26. The inverter protection circuit 44 is a real time output overload protection system that measures the inverter output current 42 and evaluates it's magnitude. If the current magnitude exceeds a set threshold, the inverter protection circuit 44 sends a signal to the inverter control circuitry 28 and the inverter switching transistors are turned OFF. The value of the limit is determined as a function of heat sink temperature and hardware output capability. This instantaneous current limiting takes place on a cycle by cycle basis at the inverter switching frequency. When output current 42 reaches a pre-determined threshold, the switches are immediately turned OFF and remain OFF for the remainder of that switching cycle. The output driving voltage is therefore disabled and output current will begin to fall. At the beginning of each subsequent switching cycle, the current magnitude is evaluated and if it has fallen below the limit, the switches are reactivated. If the current reaches the limit again during that or subsequent switching cycles, the switches are again turned OFF, and the cycle by cycle limiting continues as such. If the output current 42 reaches the limit a pre-determined number of cycles, within a pre-determined time period, that indicates a fault or sustained overload condition. The inverter is then disabled entirely and must be re-set.

We claim:

1. A method for operating a power converter circuit comprising the following steps:

providing a DC/DC converter circuit having four MOSFET switches arranged in a bridge configuration and a transformer;

providing a DC/DC control circuit with pulse width modulation control (PWM) connected to said DC/DC converter circuit;

providing a DC/AC inverter circuit with four transistor switches arranged in a bridge configuration;

providing a DC/AC control circuit with PWM control connected to said DC/AC inverter circuit;

linking the output of the DC/DC converter circuit to the input of the DC/AC inverter circuit;

applying PWM to the gates of two of the four MOSFETs of the DC/DC converter circuit; and applying a fixed duty cycle to the gates of the other two MOSFETs of the DC/DC converter circuit, whereby two pairs of MOSFETs are alternately switched ON and OFF and whereby the two MOSFETs of each pair are not switched OFF simultaneously.

2. The method of claim 1 further comprising the following step:

operating the DC/DC converter at a relatively high and relatively constant duty cycle causing the DC output to fluctuate based on fluctuation of the DC input.

3. The method of claim 1 further comprising the following step:

operating the DC/DC converter in current source mode causing the DC/DC converter to act as a current source for the DC/AC inverter.

4. The method of claim 1 further comprising the following steps:

operating the DC/AC inverter with a cycle by cycle current limit protection circuit that turns OFF the four transistors when the output current magnitude exceeds a set threshold; and operating the DC/AC inverter with a cycle by cycle current limit protection circuit that turns OFF the four transistors when the output current magnitude exceeds a set threshold for a set number of cycles.

5. A method for operating a full bridge DC/DC converter circuit comprising the following steps:

providing a DC/DC converter circuit having four MOSFET switches arranged in a bridge configuration and a transformer;

providing a DC/DC control circuit with PWM control connected to said DC/DC converter circuit;

applying PWM to the gates of two of the four MOSFETs of the DC/DC converter circuit; and applying a fixed duty cycle to the gates of the other two MOSFETs of the DC/DC converter circuit, whereby a pair of MOSFETs are alternately switched ON and OFF with the other pair and whereby the two MOSFETs of each pair are not switched OFF simultaneously.

6. The method of claim 5 further comprising the following step:

operating the DC/DC converter at a relatively high and relatively constant switching frequency causing the DC output to fluctuate based on fluctuation of the DC input.

7. The method of claim 5 further comprising the following step:

operating the DC/DC converter in current source mode causing the DC/DC converter to act as a current source for it's output load.

8. A method for operating a full bridge DC/AC inverter comprising:

providing a DC/AC inverter circuit with four transistor switches arranged in a bridge configuration;

providing a DC/AC control circuit with PWM control connected to said DC/AC inverter circuit;

operating the DC/AC inverter with a cycle by cycle current limit protection circuit that turns OFF the four transistors when the output current magnitude exceeds a set threshold; and operating the DC/AC inverter with a cycle by cycle current limit protection circuit that turns OFF the four transistors when the output current exceeds a set threshold for a set number of cycles.

9. A power converter circuit comprising:

a DC/DC converter circuit having four MOSFET switches arranged in a bridge configuration and a transformer;

a DC/DC control circuit with pulse width modulation control (PWM) connected to said DC/DC converter circuit;

a DC/AC inverter circuit with four transistor switches arranged in a bridge configuration;

a DC/AC control circuit with PWM control connected to said DC/AC inverter circuit;

the output of the DC/DC converter circuit linked to the input of the DC/AC inverter circuit;

whereby the PWM is applied to the gates of two of the four MOSFETs of the DC/DC converter circuit;

and whereby two pairs of MOSFETs are alternately switched ON and OFF and whereby the two MOSFETs of each pair are not switched OFF simultaneously.

10. The circuit of claim 9 wherein the DC/DC converter is operated at a relatively high and relatively constant duty cycle causing the DC output to fluctuate based on fluctuation of the DC input.

11. The circuit of claim 9 wherein the DC/DC converter is operated in current source mode, causing the DC/DC converter to act as a current source for the DC/AC inverter.

12. The circuit of claim 9 wherein the DC/AC inverter is operated with a cycle by cycle current limit protection circuit that turns OFF the four transistors when the output current magnitude exceeds a set threshold; and the DC/AC inverter is operated with a cycle by cycle current limit protection circuit that turns OFF the four transistors when the output current magnitude exceeds a set threshold for a set number of cycles.

13. A full bridge DC/DC converter circuit comprising:

a DC/DC converter circuit having four MOSFET switches arranged in a bridge configuration and a transformer;

a DC/DC control circuit with PWM control connected to said DC/DC converter circuit;

wherein PWM is applied to the gates of two of the four MOSFETs of the DC/DC converter circuit; and a fixed duty cycle is applied to the gates of the other two MOSFETs of the DC/DC converter.

14. The circuit of claim 13 wherein the DC/DC converter is operated at a relatively high and relatively constant switching frequency causing the DC output to fluctuate based on fluctuation of the DC input.

15. The circuit of claim 14 wherein the DC/DC converter is operated in current source mode causing the DC/DC converter to act as a current source for it's output load.

16. A full bridge DC/AC inverter comprising:

a DC/AC inverter circuit with four transistor switches arranged in a bridge configuration;

a DC/AC control circuit with PWM control connected to said DC/AC inverter circuit;

wherein the DC/AC inverter is operated with a cycle by cycle current limit protection circuit that turns OFF the four transistors when the output current magnitude exceeds a set threshold; and the DC/AC inverter is operated with a cycle by cycle current limit protection circuit that turns OFF the four transistors when the output current exceeds a set threshold for a set number of cycles.

* * * * *